(12) United States Patent
Kobayashi et al.

(10) Patent No.: US 11,500,350 B2
(45) Date of Patent: Nov. 15, 2022

(54) OPERATION EVALUATION DEVICE, OPERATION EVALUATION METHOD, AND NON-TRANSITORY COMPUTER READABLE STORAGE MEDIUM

(71) Applicant: YOKOGAWA ELECTRIC CORPORATION, Tokyo (JP)

(72) Inventors: Yasunori Kobayashi, Tokyo (JP); Sachinkumar Dattatray Sonje, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 104 days.

(21) Appl. No.: 16/264,432

(22) Filed: Jan. 31, 2019

(65) Prior Publication Data

US 2019/0243325 A1 Aug. 8, 2019

(30) Foreign Application Priority Data

Feb. 5, 2018 (JP) .............................. JP2018-018544

(51) Int. Cl.
| | |
|---|---|
| *G05B 13/02* | (2006.01) |
| *G05B 19/042* | (2006.01) |
| *G06Q 50/04* | (2012.01) |
| *G06Q 10/06* | (2012.01) |

(52) U.S. Cl.
CPC ... *G05B 19/0428* (2013.01); *G06Q 10/06398* (2013.01); *G06Q 50/04* (2013.01); *G05B 2219/24015* (2013.01)

(58) Field of Classification Search
CPC ...... G05B 19/0428; G05B 2219/24015; G06Q 50/04; G06Q 10/06398; Y02P 90/30

USPC ........................................................... 700/28
See application file for complete search history.

(56) References Cited

U.S. PATENT DOCUMENTS

| 7,848,947 B1* | 12/2010 | McGloin ................ G06Q 10/10 |
| | | 705/7.42 |
| 8,311,863 B1* | 11/2012 | Kemp ................ G06Q 10/0639 |
| | | 705/7.11 |
| 2009/0210081 A1* | 8/2009 | Sustaeta ................ H04L 67/125 |
| | | 700/99 |
| 2014/0142766 A1 | 5/2014 | Tiwari et al. |
| 2014/0278733 A1* | 9/2014 | Sabharwal ......... G06Q 10/0635 |
| | | 705/7.28 |

(Continued)

FOREIGN PATENT DOCUMENTS

| JP | H07-092895 A | 4/1995 |
| JP | 4399773 B2 | 1/2010 |

(Continued)

*Primary Examiner* — Zhipeng Wang
(74) *Attorney, Agent, or Firm* — Osha Bergman Watanabe & Burton LLP

(57) ABSTRACT

An operation evaluation device evaluates an operation work of an operator in a plant. The operation evaluation device includes a processor that calculates a plurality of key performance indicators in process control using data related to the process control performed by the operation work of the operator in the plant and obtains a score by scoring the operation work of the operator in the plant from a viewpoint of plant management using the calculated key performance indicators, and an output device that outputs the obtained score for each viewpoint of the plant management.

17 Claims, 5 Drawing Sheets

(56) References Cited

U.S. PATENT DOCUMENTS

| | | | | |
|---|---|---|---|---|
| 2014/0349255 | A1* | 11/2014 | Watt | G09B 19/18 |
| | | | | 434/107 |
| 2016/0147204 | A1* | 5/2016 | Wichmann | G05B 13/042 |
| | | | | 700/287 |
| 2016/0154913 | A1* | 6/2016 | Altare | G06Q 50/04 |
| | | | | 703/13 |
| 2018/0122157 | A1 | 5/2018 | Tomoda et al. | |
| 2019/0355275 | A1* | 11/2019 | Su | G06F 3/011 |

FOREIGN PATENT DOCUMENTS

| | | |
|---|---|---|
| JP | 2013-101461 A | 5/2013 |
| JP | 2015-184884 A | 10/2015 |
| WO | 2017/013899 A1 | 1/2017 |

\* cited by examiner

FIG. 3

| No. | KPI | TYPE | UNITS | IDEAL RANGE | CATEGORY | | | | |
|---|---|---|---|---|---|---|---|---|---|
| | | | | | PRODUCTION | PROFIT | ENERGY | RELIABILITY AND AVAILABILITY | SAFETY |
| 1 | MEASURED FEED TO THE UNIT | FLOW RATE | BPD | | | | | | |
| 2 | FCC UTILIZATION | CALCULATION | % | 90-110 | ✓ | ✓ | ✓ | ✓ | |
| 3 | SLURRY YIELD(lv%) | CALCULATION | lv% | 0-8 | ✓ | ✓ | | | |
| 4 | REACTOR OUTLET TEMPERATURE | TEMPERATURE | °F | 495-550 | ✓ | ✓ | | | |
| 5 | REACTOR PREHEAT TEMPERATURE | TEMPERATURE | °F | 250-400 | ✓ | | ✓ | | |
| 6 | REGENERATOR TEMPERATURE | TEMPERATURE | °F | 680-780 | | ✓ | | | |
| 7 | REACTOR-REGEN DELTA PRESSURE | CALCULATION | psi | -2-2 | ✓ | | | ✓ | ✓ |
| 8 | MAIN AIR BLOWER AIR RATE | FLOW RATE | klb/hr | 0-650 | | ✓ | ✓ | ✓ | ✓ |
| 9 | MAIN FRACTIONATOR PRESSURE | PRESSURE | psig | 0-650 | | ✓ | ✓ | ✓ | |
| 10 | MF BOTTOMS TEMPERATURE | TEMPERATURE | °F | 0-650 | | ✓ | ✓ | ✓ | ✓ |
| 11 | WGC SUCTION PRESSURE | PRESSURE | psig | 0-650 | | ✓ | ✓ | ✓ | |
| 12 | WGC DISCHARGE PRESSURE | PRESSURE | psig | 0-650 | | ✓ | ✓ | ✓ | |
| 13 | DE-BUTANISER BOTTOMS TEMPERATURE | TEMPERATURE | °F | 0-650 | | ✓ | ✓ | ✓ | |

TB

| No. | KPI | TYPE | UNITS | IDEAL RANGE | THE NUMBER OF TIMES KPI FALLS OUTSIDE | TIME FOR WHICH KPI FALLS OUTSIDE [min] |
|---|---|---|---|---|---|---|
| 2 | FCC UTILIZATION | CALCULATION | % | 90-110 | 10 | 32 |
| 3 | SLURRY YIELD (lv%) | CALCULATION | lv% | 0-8 | 0 | 0 |
| 4 | REACTOR OUTLET TEMPERATURE | TEMPERATURE | °F | 495-550 | 4 | 44 |
| 6 | REGENERATOR TEMPERATURE | TEMPERATURE | °F | 680-780 | 2 | 10 |
| 8 | MAIN AIR BLOWER AIR RATE | FLOW RATE | klb/hr | 0-650 | 0 | 0 |

OPERATION EVALUATION DEVICE, OPERATION EVALUATION METHOD, AND NON-TRANSITORY COMPUTER READABLE STORAGE MEDIUM

CROSS-REFERENCE TO RELATED APPLICATIONS

This application is based on and claims priority under 35 U.S.C. § 119 to Japanese Patent Application No. 2018-018544 filed on Feb. 5, 2018, the contents of which are incorporated herein by reference.

BACKGROUND

Technical Field

One or more embodiments of the present invention relate to an operation evaluation device, an operation evaluation method, and a non-transitory computer readable storage medium.

Related Art

Various products such as petroleum refined products, petrochemical products, electric power, gas, glass, paper, and pulp have been manufactured by process systems in plants, factories, and the like (hereinafter, collectively referred to simply as "plants"). In plants, process control systems controlling various state quantities (for example, a pressure, a temperature, a flow rate, a level, and the like) in process systems have been constructed, and high-level automatic operation has been realized. One of these process control systems is a distributed control system (DCS) in which a manipulation monitor and a controller are disposed in a dispersed manner.

Process control systems of the related art including the above-described distributed control system are systems that basically automatically perform constant value control for disturbances, variable-value control for changes in operation conditions, and procedure type sequence control in order to accomplish a production plan. Here, the above-described constant value control refers to control for restricting a certain state quantity (for example, a flow rate) to a fixed target value. In addition, the above-described variable-value control refers to control for causing a certain state quantity (for example, a temperature) to follow a changed target value in a case in which the target value is changed.

Japanese Patent No. 4399773 discloses an example of a distributed control system of the related art. Specifically, Japanese Patent No. 4399773 discloses a distributed control system in which a plurality of field apparatuses and a controller are connected to a network, and a controller acquires a measurement result of a measuring instrument (a flowmeter, a thermometer, or the like) which is a type of field apparatus and manipulates a manipulation device (a valve or the like) which is a type of field apparatus in accordance with the measurement result.

Incidentally, an operator belonging to a manufacturing department who uses a process control system changes a control setting value of each controller of a distributed control system to an appropriate value in order to realize a daily production plan created by a production plan department. In a case in which an optimization system is in a plant, the control setting value is set to a value obtained in consideration of profitability, energy saving, and device protection, in addition to the daily production plan. The control setting value in this case is generally set to a value that lowers a safety margin. For example, the control setting value is set so that a product quality is set to be a minimum quality passing a quality inspection or is set so that a production quantity is set to a minimum quantity satisfying the daily production plan.

When a control setting value is set so that a safety margin is reduced, even when control becomes only slightly unstable due to a factor such as a disturbance makes it impossible to keep up with a target product quality and production quantity, and thus an operator is required to perform operation with a sense of tension at all times. For this reason, the operator may change a control setting value to a safety side in the middle of operation in order to perform operation with a margin by taking a high safety margin. When such a change in the control setting value is performed, profitability, energy saving, and the like may be sacrificed. On the other hand, in a case in which an optimization system is in a plant but is not used because timely updating of an application has not been performed, or in a case in which an optimization system is not in the plant, an operator may perform operation with a margin by taking a high safety margin. Even when such operation is performed, profitability, energy saving, and the like may be sacrificed.

There are high-level control systems, represented by multivariable model prediction control, which automate control without depending on operators, but the high-level control systems may not be used when timely updating of applications has not been performed. That is, distributed control systems of the related art are not equipped with a supporting function for allowing an operator to perform operation in consideration of profitability, energy saving, and protection of a device or an apparatus.

At the management level of a plant, profitability and energy saving of operation, plant availability (ability to continuously operate a plant), and the like are digitized and managed mainly on weekly and daily bases. Thereby, high cost, a low margin, and the like at the management level may be specified and improved. In addition, at the engineering level (the level of an engineer belonging to a technical department) of a plant, values obtained by breaking down these numerical values are managed on daily and hourly bases. Thereby, a fluctuation in the quality of a raw material, deterioration of a catalyst, failure of a device, and the like at the engineering level may be specified and prevented.

However, in the operation (operation level) of a plant, there are few cases in which profitability and energy saving of operation and plant availability are monitored in minutes and seconds with numerical values broken down into operations, and deterioration of process controllability, deterioration of device performance, and the like may be specified and prevented in real-time operation at the operation level. The biggest reason for this is that distributed control systems of the related art are not equipped with a supporting function for allowing an operator to perform operation in consideration of profitability, energy saving, and protection of a device or an apparatus.

SUMMARY

In one or more embodiments of the present invention, an operation evaluation device (40) may evaluate an operation work of an operator in a plant, and the operation evaluation device may include an indicator calculating section (44a) configured to calculate a plurality of key performance indicators in process control using data (PD) related to the process control performed by the operation work of the operator in the plant, a scoring section (44b) configured to obtain a score by scoring the operation work of the operator in the plant from a viewpoint of plant management using the key performance indicators calculated by the indicator calculating section, and an output device (42) configured to output the score obtained by the scoring section for each viewpoint of the plant management.

Embodiments of the present invention will become apparent from the following detailed description of exemplary embodiments with reference to the attached drawings.

BRIEF DESCRIPTION OF THE DRAWINGS

FIG. 3 is a diagram showing an example of a score calculation table used in one or more embodiments of the present invention.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

One or more embodiments of the present invention provide an operation evaluation device, an operation evaluation method, and an operation evaluation program which are capable of evaluating operation work of an operator in a plant from a viewpoint of plant management by reflecting an evaluation index at an operation level on an evaluation index at a management level.

Hereinafter, an operation evaluation device, an operation evaluation method, and an operation evaluation program according to one or more embodiments of the present invention will be described in detail with reference to the accompanying drawings.

[Process Control System]

Figure 1:
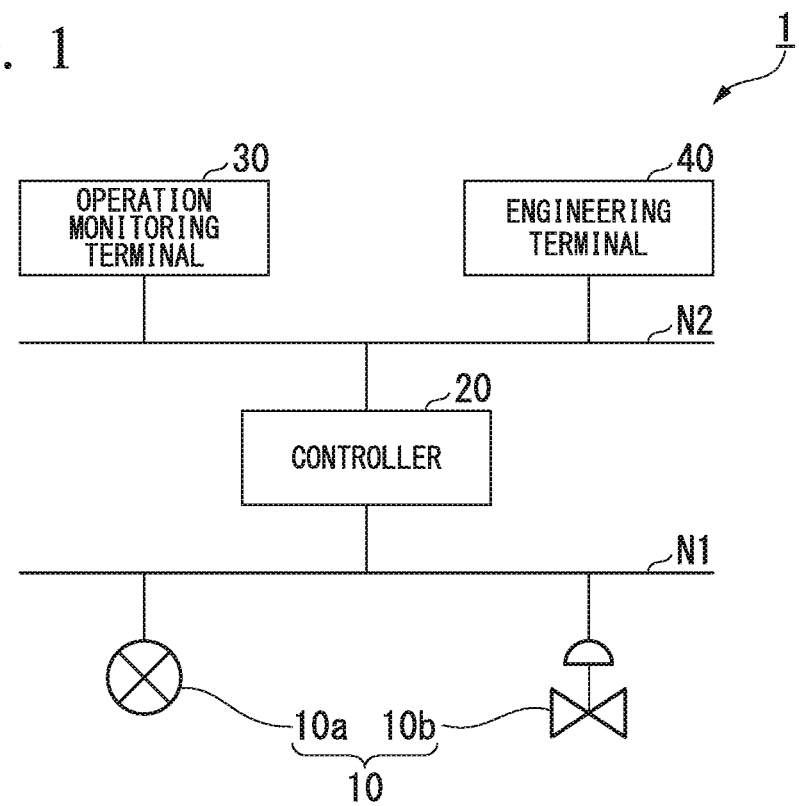
FIG. 1 is a block diagram showing main components of a process control system in which an operation evaluation device, an operation evaluation method, and an operation evaluation program are used according to one or more embodiments of the present invention.

FIG. 1 is a block diagram showing main components of a process control system in which an operation evaluation device, an operation evaluation method, and an operation evaluation program according to one or more embodiments of the present invention are used. As shown in FIG. 1, a process control system 1 includes a field apparatus 10, a controller 20, an operation monitoring terminal 30, and an engineering terminal 40 and controls a process realized in a plant (not shown) by controlling the field apparatus 10 by the controller 20 in accordance with an instruction received from the operation monitoring terminal 30, or the like.

Here, the field apparatus 10 and the controller 20 are connected to a field network N1, and the controller 20, the operation monitoring terminal 30, and the engineering terminal 40 are connected to a control network N2. The field network N1 is, for example, a wired network installed at a plant site. On the other hand, the control network N2 is, for example, a wired network for connecting the plant site and a monitoring room to each other. In addition, the field network N1 and the control network N2 may be wireless networks.

The field apparatus 10 is, for example, a sensor apparatus such as a flowmeter or a temperature sensor, a valve apparatus such as a flow rate control valve or an on-off valve, an actuator apparatus such as a fan or a motor, or any other apparatuses installed at a plant site. Further, in the one or more embodiments of the present invention, for the sake of understanding, an example of a case in which a state quantity in a process to be controlled is a flow rate of a fluid will be described. For this reason, FIG. 1 shows one sensor apparatus 10a measuring a flow rate of a fluid and one valve apparatus 10b controlling (manipulating) a flow rate of a fluid among a plurality of field apparatuses 10 installed at the plant.

The controller 20 controls the field apparatus 10 by communicating with the field apparatus 10 in accordance with an instruction received from the operation monitoring terminal 30, or the like. Specifically, the controller 20 acquires a process value measured by a certain field apparatus 10 (for example, the sensor apparatus 10a) and arithmetically operates and transmits the amount of manipulation of another field apparatus 10 (for example, the valve apparatus 10b) to control the other field apparatus 10 (for example, the valve apparatus 10b). Here, a tag is assigned to each of pieces of data dealt with by the controller 20, and the controller 20 deals with various types of data using the tags. In addition, FIG. 1 shows only one controller 20 for the sake of understanding, but a plurality of controllers 20 may be provided for several control loops.

The operation monitoring terminal 30 is, for example, a terminal which is manipulated by an operator in the plant and used to monitor a process. Specifically, the operation monitoring terminal 30 acquires input and output data of the field apparatus 10 from the controller 20, transmits movements of the field apparatus 10 and the controller 20 constituting the process control system 1 to the operator, and controls the controller 20 on the basis of an instruction of the operator.

The engineering terminal 40 is a terminal for creating information, programs, and the like to be set in the field apparatus 10, the controller 20, and the operation monitoring terminal 30 on the basis of design information stored in an instrumentation database not shown in the drawing (design information of the plant including the process control system 1). In addition, the engineering terminal 40 evaluates (marks) operation work performed by an operator in the plant using the operation monitoring terminal 30. Hereinafter, a configuration of the engineering terminal 40 as an operation evaluation device will be described in detail.

[Operation Evaluation Device]

Figure 2:
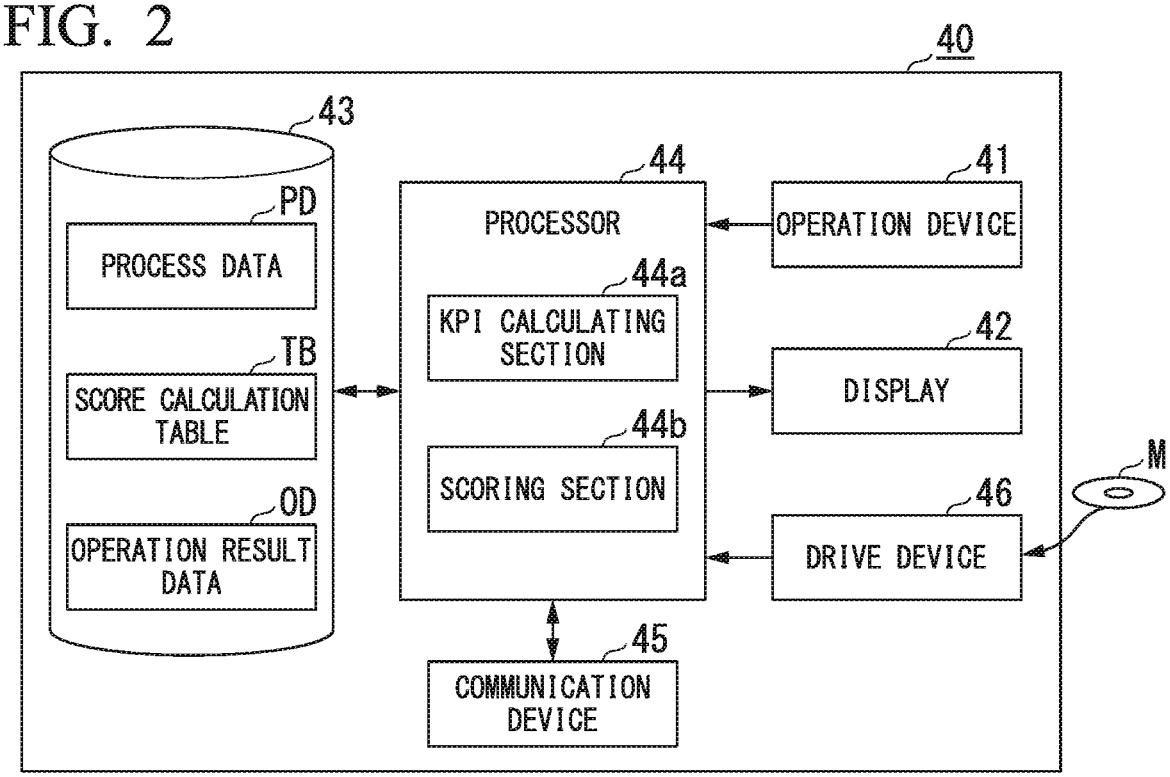
FIG. 2 is a block diagram showing main components of an engineering terminal as an operation evaluation device according to one or more embodiments of the present invention.

FIG. 2 is a block diagram showing main components of an engineering terminal as an operation evaluation device. As shown in FIG. 2, the engineering terminal 40 includes an operation device 41, a display 42 (an output device), a storage device 43, a processor 44, a communication device 45, and a drive device 46. The engineering terminal 40 is realized by, for example, a personal computer or a workstation.

The operation device 41 includes an input device such as a keyboard and a pointing device and outputs an instruction according to manipulation of a worker using the engineering terminal 40 (an instruction for the engineering terminal 40) to the processor 44. The display 42 includes a display device such as a liquid crystal display device and displays various types of information to be output from the processor 44. In addition, the operation device 41 and the display 42 may be physically separated from each other, or may be physically integrated with each other as in a touch panel type liquid crystal display device having both a display function and a manipulation function.

The storage device 43 includes an auxiliary storage device such as a hard disk drive (HDD) or a solid state drive (SSD) and stores various types of data. For example, the storage device 43 stores process data PD, a score calculation table TB, and actual operation result data OD. Although not shown in FIG. 2, the storage device 43 also stores various programs executed by, for example, the engineering terminal 40.

The above-described process data PD is data used for process control in the past.

For example, the process data PD includes data indicating a process value measured by the sensor apparatus 10a shown in FIG. 1, data indicating the amount of manipulation of the valve apparatus 10b, and the like and various alarms. The process data PD is data which is originally accumulated in the controller 20 and cannot be accessed without previously designated authority. In one or more embodiments of the present invention, for the sake of description, it is assumed that data which is the same data as the process data PD accumulated in the controller 20 is stored in the storage device 43.

The score calculation table TB is a table which is used to score operation work of an operator in the plant from a viewpoint of plant management. Specifically, the score calculation table TB is a table in which information indicating which key performance indicator (KPI) in process control is used is stored for each viewpoint of plant management in order to score the operation work from a viewpoint of plant management. Here, the viewpoints of the above-described plant management include a viewpoint of "Profitability", a viewpoint of "Energy saving", a viewpoint of "Reliability and availability", a viewpoint of "Planning", a viewpoint of "Safety", and the like. In addition, details of the score calculation table TB will be described later.

The actual operation result data OD is data indicating actual operation results of an operator in the plant. In a plant where a continuous process is realized, for example, a shift of a three-shift system is assembled, and a plurality of operators are engaged in the operation of the plant. For this reason, the actual operation result data OD is prepared for each operator. The actual operation result data OD includes information indicating an indicator of an operator, information indicating the times at which the operator starts and stops work, information indicating conditions of operation, and the like.

The processor 44 totally controls the operation of the engineering terminal 40 on the basis of a manipulation instruction input from the operation device 41 or an instruction transmitted through the control network N2. For example, in a case in which an instruction for creating information to be set in the controller 20 is input from the operation device 41, a process of creating necessary information is performed on the basis of design information stored in an instrumentation database not shown in the drawing.

In addition, the processor 44 includes a KPI calculating section 44a (an indicator calculating section) and a scoring section 44b and performs a process of scoring operation work of an operator in the plant from a viewpoint of plant management. The KPI calculating section 44a performs a process of obtaining a previously designated KPI using the process data PD stored in the storage device 43. In a case in which a KPI to be obtained is specific data included in the process data PD, the KPI calculating section 44a performs a process of extracting data used as a KPI from the process data PD. Further, in a case in which a KPI to be obtained is obtained from a plurality of pieces of data included in the process data PD through an arithmetic operation, the KPI calculating section 44a extracts the plurality of pieces of data from the process data PD and then performs the arithmetic operation for obtaining the KPI.

The scoring section 44b performs a process of scoring operation work of an operator in the plant from the viewpoint of plant management using the KPI obtained by the KPI calculating section 44a. The KPI calculating section 44a performs a process of scoring operation work of an operator in the plant using the score calculation table TB and the actual operation result data OD stored in the storage device 43. In addition, details of a process performed by the scoring section 44b will be described later.

The communication device 45 is controlled by the processor 44 and performs communication through the control network N2. In addition, the communication device 45 may be a communication device performing wired communication or may be a communication device performing wireless communication. The drive device 46 reads out data recorded in a computer-readable recording medium M such as a CD-ROM or a DVD (registered trademark)-ROM. The recording medium M stores a program for realizing functions of blocks of the engineering terminal 40 (for example, a function of the processor 44).

The programs stored in the recording medium M are read by the drive device 46 and installed in the engineering terminal 40, so that the functions of the blocks of the engineering terminal 40 are realized by software. That is, these functions are realized by software and hardware resources in cooperation. In addition, the programs for realizing the functions of the blocks of the engineering terminal 40 may be distributed on the recording medium M or may be distributed through an external network such as the Internet.

<Score Calculation Table>

FIG. 3 is a diagram showing an example of a score calculation table used in one or more embodiments of the present invention.

Figure 4:
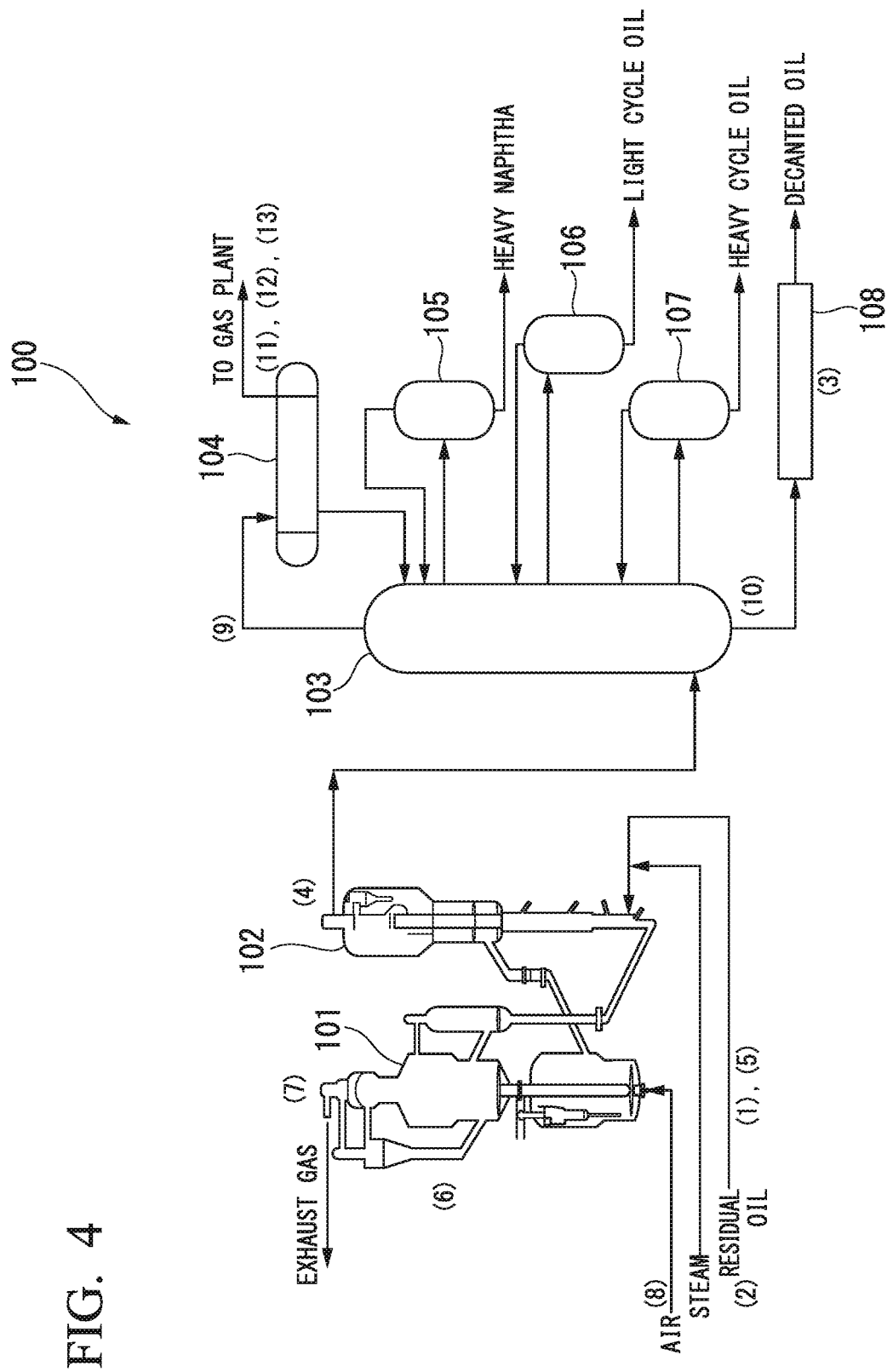
FIG. 4 is a diagram showing equipment in a plant in which the score calculation table shown in FIG. 3 is used according to one or more embodiments of the present invention.

In addition, the score calculation table TB shown in FIG. 3 is a table with respect to an equipment shown in FIG. 4. FIG. 4 is a diagram showing an equipment in a plant in which the score calculation table shown in FIG. 3 is used. In addition, the equipment shown in FIG. 4 is a fluid catalytic cracking (FCC) unit.

A fluid catalytic cracking unit 100 shown in FIG. 4 includes a regeneration tower 101, a reactor 102, a rectifying tower 103, a reflux drum 104, an HN stripper 105, an LCO stripper 106, an HCO stripper 107, a slurry separator 108, and the like. The fluid catalytic cracking unit 100 is an equipment that mainly manufactures gasoline products by making a catalyst flow between the regeneration tower 101 and the reactor 102 and continuously cracking heavy oil as a raw material.

As shown in FIG. 3, the score calculation table TB is a table having items of "No.", "KPI", "Type", "Units", "Ideal Range", and "Category". Here, "No." is a number, uniquely determined, which is assigned to each KPI in order to specify each KPI prescribed in "KPI". In addition, "KPI" is a KPI which is used in process control. The KPI illustrated in FIG. 3 is used in process control of the fluid catalytic cracking unit 100 shown in FIG. 4, and is, for example, as follows.

1. Measured Feed to the Unit
2. FCC Utilization
3. Slurry Yield
4. Reactor Outlet Temperature
5. Reactor Preheat Temperature
6. Regenerator Temperature
7. Reactor-Regen Delta Pressure
8. Main Air blower air rate
9. Main Fractionator Pressure
10. MF Bottoms Temperature
11. WGC Suction Pressure
12. WGC Discharge Pressure
13. De-butaniser Bottoms Temperature The KPI illustrated in FIG. 3 is obtained using data obtained at rough positions where numbers surrounded by parentheses are written in FIG. 4. For example, KPIs of "Regenerator Temperature" and "Reactor-Regen Delta Pressure" are KPIs obtained using data obtained at rough positions where numbers (6) and (7) in FIG. 4 are written (the regeneration tower 101 or the vicinity thereof). In addition, KPIs of "Main Fractionator Pressure" and "MF Bottoms Temperature" are KPIs obtained using data obtained at rough positions where numbers (9) and (10) in FIG. 4 are written (the rectifying tower 103 or the vicinity thereof).

In addition, the "Type" is information for prescribing the type of each KPI, the "Type" includes "Flow rate", "Pressure", "Temperature", "Calculation", and the like. KPIs for which "Flow rate", "Pressure", and "Temperature" are prescribed respectively indicates a flow rate, a pressure, and a temperature as physical quantities which are obtained by extracting specific data included in the process data PD. On the other hand, a KPI for which "calculation" is prescribed indicates a KPI obtained from a plurality of pieces of data included in the process data PD through arithmetic operation.

The "Units" is information indicating the unit of each KPI. For example, pounds per square inch gauge (psi) or pounds per square inch gauge (psig) is prescribed as "Units" in a KPI for which the "Type" is "Pressure", and barrel per day (BPD) or klb/hr is prescribed as "Units" in a KPI for which the "Type" is "Flow rate". The "Ideal Range" is information for prescribing a range of each KPI to be included (in other words, a range in which a variation of each KPI is allowed) in manufacturing a product having predetermined quality through process control.

The "Category" is information indicating a viewpoint of plant management at the time of scoring operation work of an operator in the plant. In the example shown in FIG. 3, the "Category" includes "Production", "Profit", "Energy", "Reliability and Availability", and "Safety". These categories have the following meaning for each plant management level (management level), each engineering level of the plant (the level of an engineer belonging to a technical department), and each operation (operation level) of the plant.

Management Level

Production: a manufacturing cost, sales, a difference between a plan and an actual result, and the like (planning)

Profit: a margin, utilization of a device, and the like (profitability)

Energy: an energy cost and the like (energy saving)

Reliability and availability: a maintenance cost and the like

Safety: an accident, a near miss, environmental regulation, and the like

Engineering Level

Production: a difference between a plan and an actual result of each of a raw material, a production quantity, and a product quality Profit: process performance, optimization system performance, and the like Energy: the amounts of steam, fuel, electricity, and water used Reliability and availability: reliability and availability of an apparatus (an average failure interval, an average repairing time), and the like Safety: a trigger of an emergency stop system, and the like Operation Level Production: a feed flow rate, a product flow rate, control performance, and the like Profit: process performance, advanced process control (APC) performance, and the like Energy: a heater, a heating furnace, heat exchanger performance, and the like Reliability and availability: performance of an apparatus, and the like Safety: an important alarm, and the like In each of the categories, information for specifying a KPI used at the time of scoring operation work of an operator in the plant from viewpoints of plant management is prescribed. Further, in FIG. 3, this information is indicated by a check mark. For example, in the category of "Production", pieces of information for specifying "FCC utilization", "Slurry yield", "Reactor outlet temperature", "Regenerator temperature", and "Main air blower air rate" are prescribed. For this reason, in a case in which operation work of an operator in the plant is scored from a viewpoint of "Planning", the above-described five types of KPIs are used.

Further, in the category of "Profit", pieces of information for specifying "FCC utilization", "Slurry yield", "Reactor outlet temperature", "Reactor preheat temperature", "Main air blower air rate", "Main fractionator pressure", "MF bottoms temperature", "WGC suction pressure", "WGC discharge pressure", and "De-butaniser bottoms temperature" are prescribed. For this reason, in a case in which operation work of an operator in the plant is scored from a viewpoint of "Profitability", the above-described ten types of KPIs are used.

[Operation Evaluation Method]

Figures 5, 6:
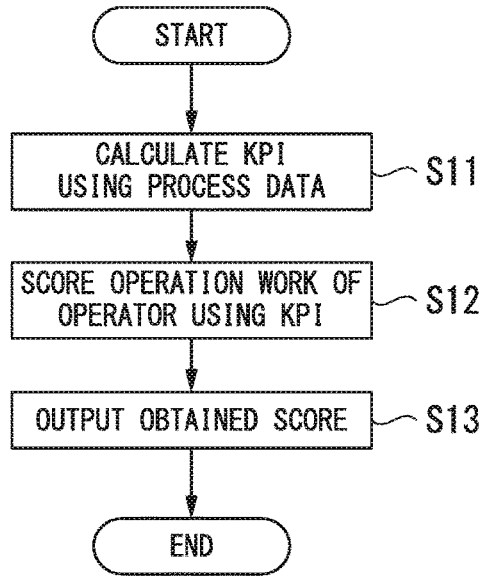
FIG. 5 is a flowchart showing an outline of an operation evaluation method according to one or more embodiments of the present invention.
FIG. 6 is a diagram for describing a process of scoring operation work of an operator in a plant according to one or more embodiments of the present invention.

Next, an operation evaluation method according to one or more embodiments of the present invention will be described. FIG. 5 is a flowchart showing an outline of an operation evaluation method according to one or more embodiments of the present invention. The flowchart shown in FIG. 5 is started, for example, each time a work termination time of an operator in the plant arrives (for each working time). For example, in a case in which a shift of a three-shift system of 7:00 to 15:00 (8 hours), 15:00 to 23:00 (8 hours), and 23:00 to 7:00 (8 hours) is assembled in the plant, the processing is started at 7:00, 15:00, and 23:00 every day. In addition, the processing may be started when a starting instruction received from an operator (for example, a manager in the plant) manipulating the engineering terminal 40 is input to the engineering terminal 40 or may be started at an time intervals (for example, a minute, 30 minutes, an hour, or the like).

When the processing of the flowchart shown in FIG. 5 is started, first, the KPI calculating section 44a of the engineering terminal 40 performs a process of calculating a KPI using the process data PD stored in the storage device 43 (step S11: an index calculation step). Next, the scoring section 44b of the engineering terminal 40 performs a process of scoring operation work of an operator in the plant using the KPI calculated by the KPI calculating section 44a (step S12: a scoring step).

Specifically, the scoring section 44b of the engineering terminal 40 performs a process of scoring operation work of an operator in the plant from the viewpoint of plant management by using the score calculation table TB and the operation result data OD which are stored in the storage device 43. FIG. 6 is a diagram for describing a process of scoring operation work of an operator in the plant. Here, a description will be given with an example of a process of scoring operation work of an operator in the plant from the viewpoint of "Production".

First, the scoring section 44b performs a process of specifying a KPI used in a case in which operation work of an operator in the plant is scored from the viewpoint of "Production" with reference to the score calculation table TB.

In the process, five KPIs of "FCC utilization", "Slurry yield", "Reactor outlet temperature", "Regenerator temperature", and "Main air blower air rate" are specified (see FIGS. 3 and 4).

Next, the scoring section 44b calculates evaluation values A and B for each KPI using the following expressions with respect to an operator having performed work for 8 hours this time. In addition, the scoring section 44b extracts N1 and T1 in the following expressions from the operation result data OD and calculates N0 in the following expression using data extracted from the operation result data OD. In addition, N0 in the following expression may be calculated in advance.

$$A=((N0-N1)/N0) \times 50$$

$$B=((T0-T1)/T0) \times 50$$

The variables in the above expressions are as follows.

N0: a maximum value of the number of times a KPI falls outside a target range during a working time N1: the number of times a KPI falls outside a target range during this working time T0: a working time (for example, 480 minutes (=8 hours))

T1: a continuous time (minutes) for which a KPI falls outside a target range during this working time In addition, determination regarding whether or not a KPI falls within a target range is performed at a fixed cycle (for example, a minute). For example, when it is assumed that the above-described determination cycle is a minute, a working time is 8 hours, and a KPI falls outside a target range during a working time at all times, a relationship of N0=480 times is established.

In addition, the scoring section 44b obtains an average value of the sum of evaluation values A and B of KPIs as a score from the viewpoint of "Production". Specifically, an average value of the sum of evaluation values A and B of a KPI of "FCC utilization", the sum of evaluation values A and B of a KPI of "Slurry yield", the sum of evaluation values A and B of a KPI of "Reactor outlet temperature", the sum of evaluation values A and B of a KPI of "Regenerator temperature", and the sum of evaluation values A and B of a KPI of "Main air blower air rate" is obtained as a score from the viewpoint of "Production".

In the example shown in FIG. 6, the evaluation values A and B of the KPIs have, for example, the following values. In addition, here, N0 is set to "480".

"FCC utilization": A=49.0, B=46.7
"Slurry yield": A=50, B=50
"Reactor outlet temperature": A=49.6, B=45.4
"Regenerator temperature": A=49.8, B=49.0
"Main air blower air rate": A=50, B=50

A score from the viewpoint of "Production" which is finally obtained is 97.9.

The above-described process is similarly performed for viewpoints other than the viewpoint of "Production" (for example, the viewpoint of "Profit", the viewpoint of "Energy", the viewpoint of "Reliability and availability", the viewpoint of "Safety", and the like). When the above-described process is terminated, the engineering terminal 40 performs a process of outputting obtained scores (step S13: an output step). Thereby, the scores from the above-described viewpoints are displayed on the display 42 of the engineering terminal 40.

Figure 7:
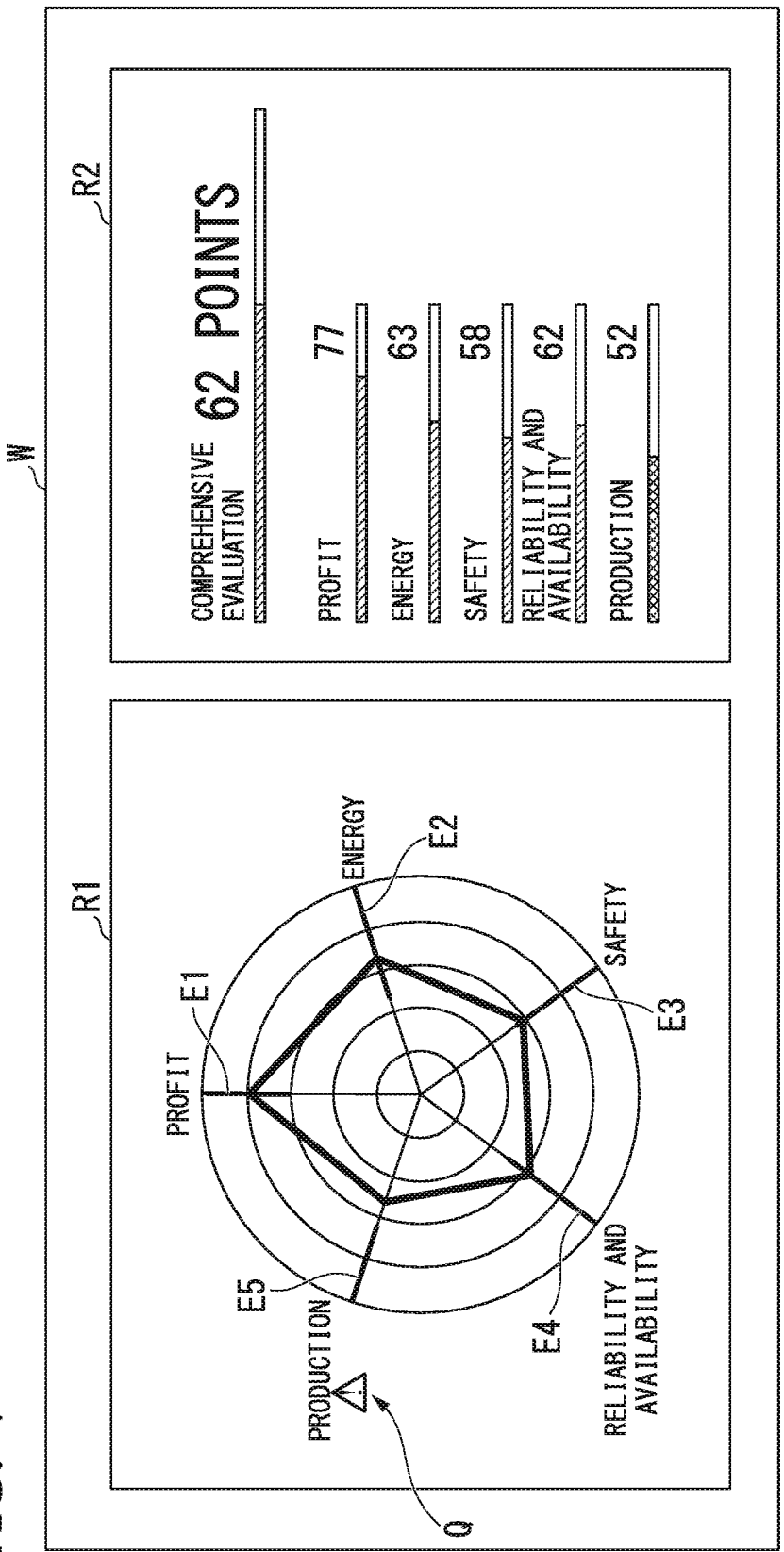
FIG. 7 is a diagram showing a display example of evaluation values of operation work in one or more embodiments of the present invention.

FIG. 7 is a diagram showing a display example of evaluation values of operation work in one or more embodiments of the present invention. In the example shown in FIG. 7, scores from the above-described viewpoints are displayed within a window W displayed on the display 42 in two different formats. Specifically, scores from the above-described viewpoints are displayed as a radar chart in a display region R1 provided within the window W, and scores from the above-described viewpoints are displayed as a bar graph and numerical values in a display region R2 provided within the window W.

In the example shown in FIG. 7, the radar chart displayed in the display region R1 is a 5-axis radar chart with elements of "Profit", "Energy", "Safety", "Reliability and availability", and "Production". Thick lines attached to the axes (thick lines with reference numerals E1 to E5) indicate ranges of scores recognized as being passed from each of the viewpoints. It is possible to immediately determine whether or not scores of the axes have been passed depending on whether or not the scores of the axes are displayed on the thick lines with reference numerals E1 to E5. In addition, a mark Q for calling attention is displayed on an axis of which the score is rejected. It is possible to immediately determine an axis of which the score is rejected on the basis of the mark Q.

In the example shown in FIG. 7, a bar graph with elements of "Profit", "Energy", "Safety", "Reliability and availability", and "Production" and numerical values of the elements are displayed in the display region R2. Further, in the example shown in FIG. 7, an average value of scores of the five elements is displayed as a comprehensive evaluation using a bar graph and a numerical value. In addition, a bar graph of which the score is rejected is displayed in a different manner from the other bar graphs (for example, the bar graph is displayed in a different color). Thereby, it is possible to immediately determine an element of which the score is rejected.

As described above, in one or more embodiments of the present invention, a plurality of KPIs in process control are calculated using the process data PD, and operation work of an operator in the plant is scored from the viewpoint of plant management using the calculated KPIs and is output. Thereby, it is possible to quantitatively evaluate operation work of an operator in the plant from the viewpoint of plant management. The operator in the plant can quantitatively ascertain what it occurs in the operation work of the operator from the viewpoint of plant management. Therefore, the operator in the plant is given an incentive for remedying the above-described occurrence and performs operation for realizing the viewpoint of plant management.

Although the operation evaluation device, the operation evaluation method, and the operation evaluation program according to one or more embodiments of the present invention have been described, one or more embodiments of the present invention is not limited to the above-described embodiments and can be freely changed without departing from the scope of the invention. For example, in one or more embodiments of the present invention, an example in which the engineering terminal 40 has a function of evaluating operation work of an operator in the plant has been described. However, the controller 20 or the operation monitoring terminal 30 may have the function.

Further, in one or more embodiments of the present invention, an example in which operation work is scored on the basis of a maximum value (a maximum value of the number of times a KPI falls outside a target range during a working time) for each operator in the plant has been described. However, evaluation for operation work may be performed between operators on the basis of an operator having the highest score, may be performed on the basis of an expected value obtained through simulation, or may be performed on the basis of an actual result value during operation in the past.

Further, in one or more embodiments of the present invention, an example in which evaluation for operation work is started each time a work termination time of an operator in the plant arrives (7:00, 15:00, and 23:00 every day) has been described. However, evaluation for operation work may be performed, for example, on the basis of times of login and logout of the operator with respect to a console. Further, in the one or more embodiments of the present invention, an example in which scores of an operator in the plant are displayed on the display 42 of the engineering terminal 40 has been described. However, the scores of the operator in the plant may be output from the engineering terminal 40 and displayed on another device (for example, the operation monitoring terminal 30).

While one or more embodiments of the invention have been described and illustrated above, it should be understood that these are exemplary of the invention and are not to be considered as limiting. Additions, omissions, substitutions, and other modifications can be made without departing from the spirit or scope of the invention. Accordingly, one or more embodiments of the invention are not to be considered as being limited by the foregoing description, and are only limited by the scope of the appended claims.

Additionally, a program for realizing a part or all of the functions of the engineering terminal 40 according to one or more embodiments of the present invention may be stored in a computer readable storage medium and the program stored in the storage medium may be read and executed by the computer system to execute a part or all of the processes performed by the engineering terminal 40. Additionally, the "computer system" mentioned herein may include OS or hardware such as peripheral devices. Further, the "computer system" also includes a WWW system having a homepage providing environment (or display environment). Further, the "computer readable storage medium" means a storage device including a portable medium such as a flexible disk, a magneto-optical disk, a ROM, and a CD-ROM or a hard disk built in the computer system.

Furthermore, the "computer readable storage medium" also includes a medium that stores a program for a predetermined time as in a volatile memory (for example, RAM: Dynamic Random Access Memory) inside the computer system which becomes a server or a client when the program is transmitted via a communication network such as an internet or a communication line such as a phone line. The program may be transmitted from a computer system storing the program in a storage device or the like to other computer systems via a transmission medium or a transmission wave in the transmission medium. Here, the "transmission medium" that transmits the program means a medium having an information transmission function as in a communication network such as an internet or a communication line such as a phone line. Further, the program may be used to realize a part of the above-described functions. Furthermore, the function may be realized by the combination of the program stored in the computer system in advance, that is, a so-called difference file (difference program).

As used herein, the following directional terms "front, back, above, downward, right, left, vertical, horizontal, below, transverse, row and column" as well as any other similar directional terms refer to those instructions of a device according to one or more embodiments of the present invention. Accordingly, these terms, as utilized to describe one or more embodiments of the present invention should be interpreted relative to a device related to one or more embodiments of the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part in embodiments of the present invention.

The term "unit" is used to describe a component, unit or part of a hardware and/or software that is constructed and/or programmed to carry out the desired function. Typical examples of the hardware may include, but are not limited to, a device and a circuit.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An operation evaluation device that evaluates an operation work of an operator in a plant, the operation evaluation device comprising:
 a storage that stores one or more score calculation tables each indicating a plurality of evaluation categories of the operation work, wherein each of the evaluation categories corresponds to one or more key performance indicators (KPIs) in process control in the plant;
 a processor that reads instructions from a recording medium and executes the instructions to:
  receive, from a field device installed in the plant, process data used for the process control;
  calculate the KPIs using the received process data;
  obtain scores of the respective evaluation categories using the score calculation table, wherein among the scores, a score of a predetermined evaluation category among the evaluation categories is obtained based on the one or more KPIs corresponding to the predetermined evaluation category;

determine an average of the scores;

set pass ranges of the scores; and create a radar chart that has axes respectively corresponding to the evaluation categories and shows the scores along the axes; and a display that displays, on a screen, the average and the radar chart side by side to show a balance of the evaluation categories, and highlights, on the screen, the pass ranges on the axes of the radar chart such that a user seeing the display can grasp whether each of the scores is within each of the pass ranges.

2. The operation evaluation device according to claim 1, wherein the evaluation categories include at least one of "Profitability," "Energy saving," "Reliability and availability," "Planning," or "Safety."

3. The operation evaluation device according to claim 1, wherein the processor scores the operation work each time a work termination time of the operator in the plant arrives.

4. The operation evaluation device according to claim 1, wherein the processor scores the operation work using at least one of:

a number of times each of the calculated KPIs has fallen outside a predetermined target range, or a continuous period of time during which each of the KPIs is outside the target range.

5. The operation evaluation device according to claim 1, wherein the processor receives process data measured by the field device, the storage stores the process data, and the processor calculates the KPIs using the process data stored in the storage.

6. The operation evaluation device according to claim 5, wherein the storage further stores actual operation result data indicating actual operation results of the operator in the plant, and wherein the processor scores the operation work using the calculated KPIs, the score calculation table stored in the storage, and the actual operation result data.

7. An operation evaluation method for evaluating an operation work of an operator in a plant, the operation evaluation method comprising:

storing, into a storage, one or more score calculation tables each indicating a plurality of evaluation categories of the operation work, wherein each of the evaluation categories corresponds to one or more key performance indicators (KPIs) in process control in the plant;

receiving, from a field device installed in the plant, process data used for the process control;

calculating, by a processor, the KPIs using the received process data;

obtaining, by the processor, scores of the respective evaluation categories using the score calculation table, wherein among the scores, a score of a predetermined evaluation category among the evaluation categories is obtained based on the one or more KPIs corresponding to the predetermined evaluation category;

determining an average of the scores;

setting pass ranges of the scores;

creating a radar chart that has axes respectively corresponding to the evaluation categories and shows the scores along the axes;

displaying, on a screen by a display, the average and the radar chart side by side to show a balance of the evaluation categories; and highlighting, on the screen by the display, the pass ranges on the axes of the radar chart such that a user seeing the display can grasp whether each of the scores is within each of the pass ranges.

8. The operation evaluation method according to claim 7, wherein the evaluation categories include at least one of "Profitability," "Energy saving," "Reliability and availability," "Planning," or "Safety."

9. The operation evaluation method according to claim 7, further comprising:

scoring, by the processor, the operation work each time a work termination time of the operator in the plant arrives.

10. The operation evaluation method according to claim 7, further comprising:

scoring, by the processor, the operation work using at least one of:

a number of times each of the calculated KPIs has fallen outside a predetermined target range, or a continuous period of time during which each of the KPIs is outside the target range.

11. The operation evaluation method according to claim 7, further comprising:

receiving, by the processor, process data measured by the field device;

storing, into the storage, the process data; and calculating, by the processor, the KPIs using the process data.

12. The operation evaluation method according to claim 11, further comprising:

storing, into the storage, actual operation result data indicating actual operation results of the operator in the plant; and scoring, by the processor, the operation work using the calculated KPIs, the score calculation table, and the actual operation result data.

13. A non-transitory computer readable storage medium storing operation evaluation instructions executed by a computer that evaluates an operation work of an operator in a plant, the operation evaluation instructions comprising:

storing, into a storage, one or more score calculation tables each indicating a plurality of evaluation categories of the operation work, wherein each of the evaluation categories corresponds to one or more key performance indicators (KPIs) in process control in the plant;

receiving, from a field device installed in the plant, process data used for the process control;

calculating, by a processor, the KPIs using the received process data;

obtaining, by the processor, scores of the respective evaluation categories using the score calculation table, wherein among the scores, a score of a predetermined evaluation category among the evaluation categories is obtained based on the one or more KPIs corresponding to the predetermined evaluation category;

determining an average of the scores;

setting pass ranges of the scores;

creating a radar chart that has axes respectively corresponding to the evaluation categories and shows the scores along the axes;

displaying, on a screen by a display, the average and the radar chart side by side to show a balance of the evaluation categories; and highlighting, on the screen by the display, the pass ranges on the axes of the radar chart such that a user seeing the display can grasp whether each of the scores is within each of the pass ranges used for optimizing an operation status of the plant.

14. The non-transitory computer readable storage medium according to claim 13, wherein the evaluation categories include at least one of "Profitability," "Energy saving," "Reliability and availability," "Planning," or "Safety."

15. The non-transitory computer readable storage medium according to claim 13, wherein the operation evaluation instructions further comprise:

scoring, by the processor, the operation work each time a work termination time of the operator in the plant arrives.

16. The non-transitory computer readable storage medium according to claim 13, wherein the operation evaluation instructions further comprise:

scoring, by the processor, the operation work of the operator in the plant using at least one of:
a number of times each of the calculated KPIs has fallen outside a predetermined target range, or
a continuous period of time during which each of the KPIs is outside the target range.

17. The non-transitory computer readable storage medium according to claim 15, wherein the operation evaluation instructions further comprise:

receiving, by the processor, process data measured by the field device;
storing, into the storage, the process data; and
calculating, by the processor, the KPIs using the process data.

* * * * *

UNITED STATES PATENT AND TRADEMARK OFFICE
CERTIFICATE OF CORRECTION

| | |
|---|---|
| PATENT NO. | : 11,500,350 B2 |
| APPLICATION NO. | : 16/264432 |
| DATED | : November 15, 2022 |
| INVENTOR(S) | : Yasunori Kobayashi et al. |

It is certified that error appears in the above-identified patent and that said Letters Patent is hereby corrected as shown below:

In the Claims

At Column 13, Claim number 1, Line number 9, "a display that" should read -- a display that: --, At Column 15, Claim number 13, Line number 7, "used for optimizing an operation status of the plant" should be deleted, At Column 16, Claim number 17, Line number 11, "according to claim 15" should read -- according to claim 13 --.

Signed and Sealed this
Fourth Day of April, 2023

Katherine Kelly Vidal
*Director of the United States Patent and Trademark Office*